3 Sheets.
Sheet 1.

J. T. Breun & G. M. Jacobs.

Edging Button Holes.

No 3,344 Reissued Mar. 30. 1869.

Witnesses.

Theo Frisch
J. A. Service

Inventor.

John T. Breun
G. M. Jacobs
Per Munn & Co
Attorneys

3 Sheets.
Sheet 2.

J. T. Breun & G. M. Jacobs.

Edging Button Holes.

No 3,344. Reissued Mar. 30. 1869.

Witnesses.

Theo Tusch
J. A. Serrell

Inventor.

John T Breun
G M Jacobs
Per Munn & Co
Attorneys.

3 Sheets.
Sheet 3
J. T. Breun & G. M. Jacobs.
Edging Button Holes.
No 3,344. Reissued Mar. 30 1869.
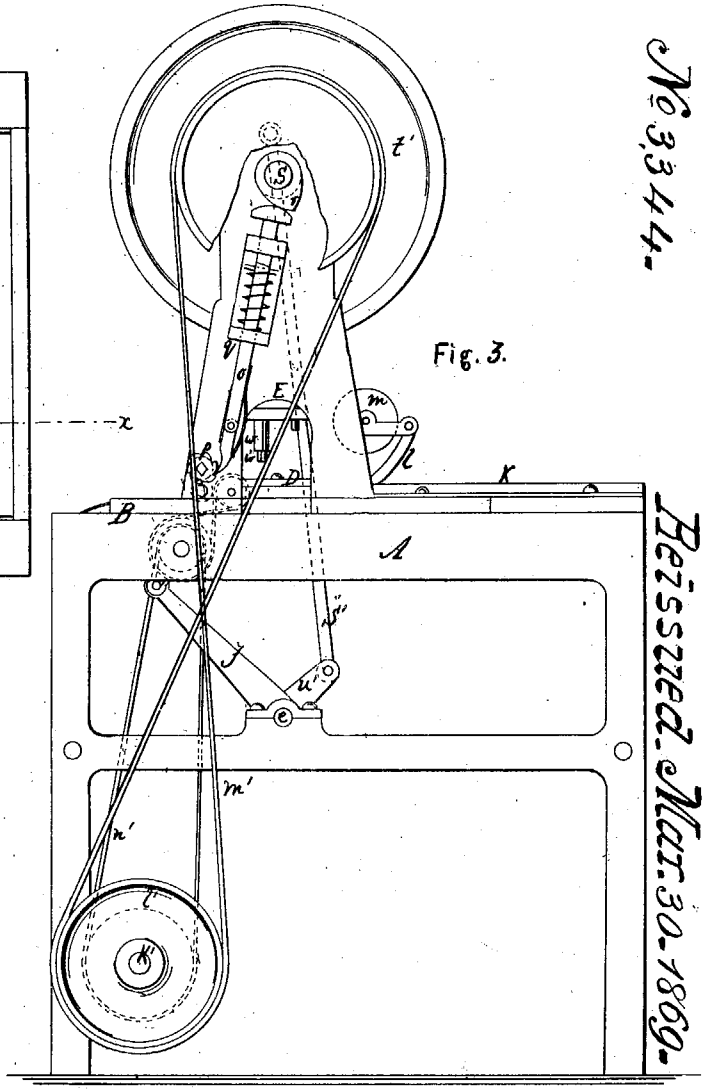
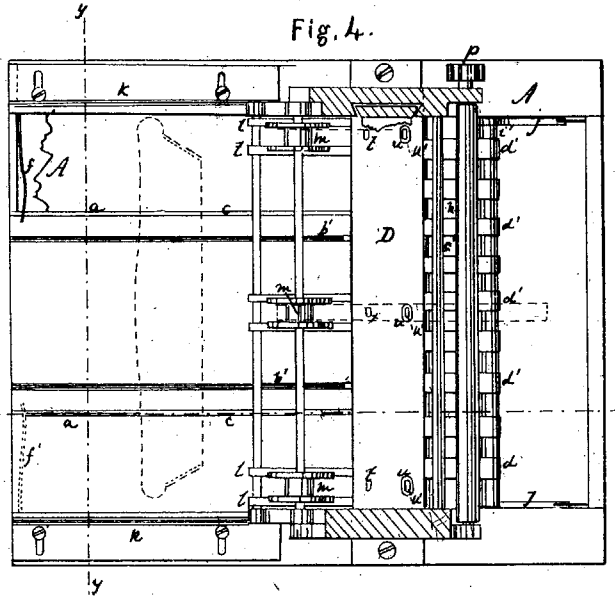
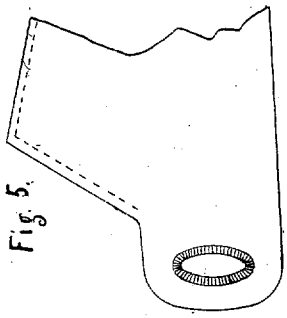
Witnesses.
Theo Frisch
J. A. Service.
Inventor.
John T. Breun
G. M. Jacobs
Per Munn & Co
Attorneys.

UNITED STATES PATENT OFFICE.

GEORGE W. RAY AND VARNUM N. TAYLOR, OF SPRINGFIELD, MASSACHUSETTS, ASSIGNEES, BY MESNE ASSIGNMENTS, OF JOHN M. BRUEN AND G. M. JACOBS.

MACHINE FOR CUTTING AND RE-ENFORCING BUTTON-HOLES.

Specification forming part of Letters Patent No. 59,957, dated November 27, 1866; Reissue No. 3,344, dated March 30, 1869.

*To all whom it may concern:*

Be it known that JOHN T. BRUEN and G. M. JACOBS, of the city and county and State of New York, invented a new and useful Improved Machine for Edging Button-Holes; and we do hereby declare that the following is a full, clear, and exact description thereof, reference being had to the accompanying drawings, making a part of this specification, and to the letters of reference marked thereon, in which—

Figure 1:
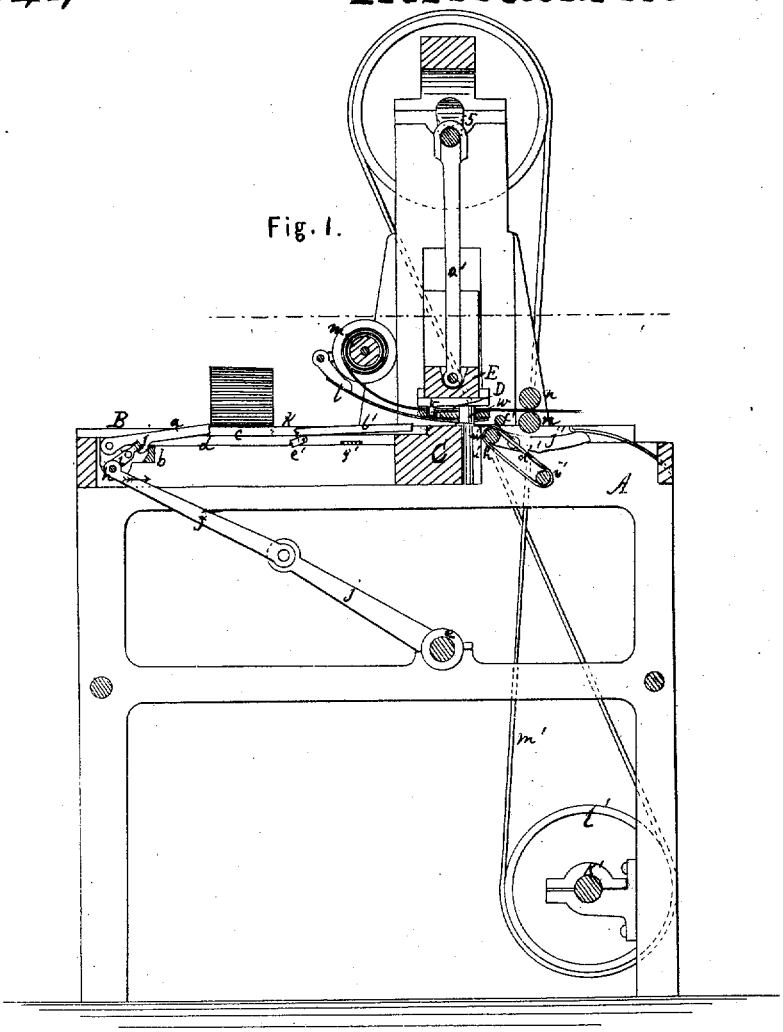
Figure 2:
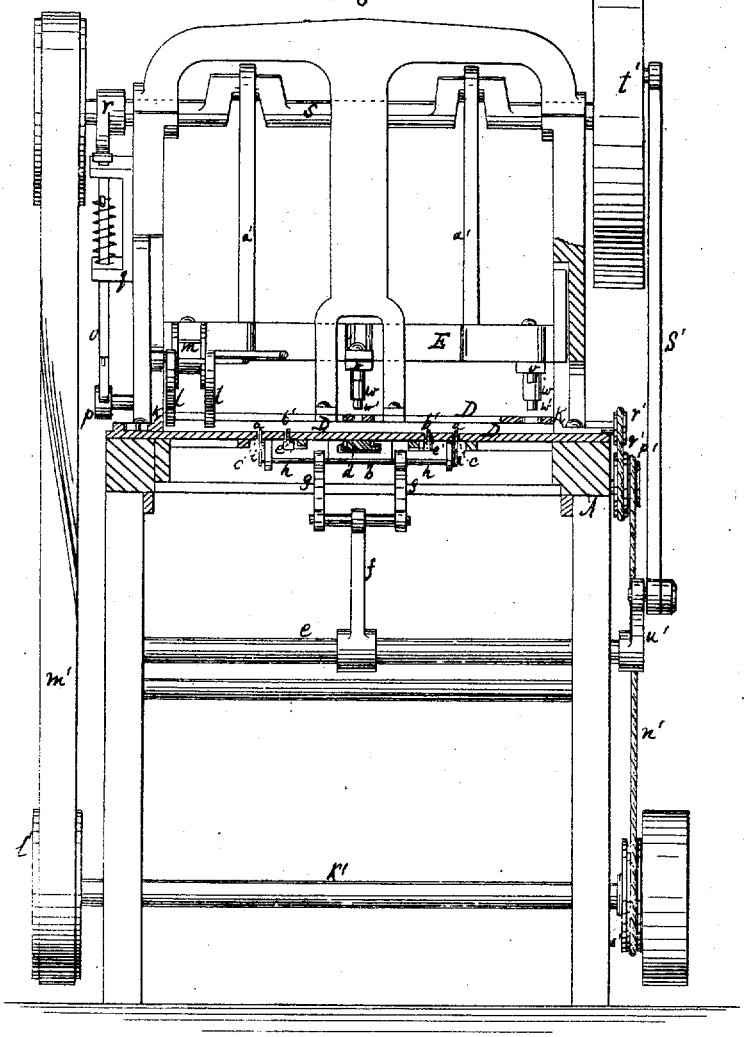

Figure 1 represents a longitudinal vertical section of the invention through the line *x x* of Fig 4. Fig. 2 is a transverse vertical section of the same through line *y y* of Fig. 4. Fig. 3 is a side elevation of the same. Fig. 4 is a horizontal section of the same through line *z z* of Fig. 1, and Fig. 5 is a plan view of the button-hole when finished.

Similar letters of reference indicate like parts.

This invention relates to a machine which is intended to cut out and apply automatically an annular disk of muslin or other textile fabric to the edge of the button-holes in paper collars, cuffs, and other articles of paper wearing-apparel, so as to make said button-holes strong and durable and render them capable of resisting the strain to which they are exposed. The paper collars or cuffs or other articles are fed by suitable toes to the punching-mechanism, which consists of two die-plates with their dies, one of said die-plates being placed a certain distance above the other. The muslin or other textile fabric, which is first cut into strips of the proper width, and having had suitable glue or cement applied thereto, and then dried, is fed to the punching mechanism, and under the dies automatically, from suitable rollers or drums above the die-plate, which is provided with two sets of holes, one set to correspond to the inner and the other set to correspond to the outer periphery of the annular disks. While the strips of muslin are carried between the dies and die-plates, the annular disks are punched from said strips and forced through the die-plate onto the surface of the collar or other article, moisture or heat being applied either to the collar or to the disks, which are then caused to adhere permanently to the collar or other article by pressure; and the button-holes are punched through the disk and collar, thus making a strong and durable button-hole.

The following is a description of the construction of the invention, which will enable those properly skilled in the art to make and use the same.

In the drawings, A represents a frame made of cast-iron or of any other suitable material, and provided with a platform or table, B, which supports the blanks to be acted upon by the machine. One of the blanks after the other is passed onto the die-plate C by the action of the feeding-toes *a*, which are pivoted to the ends of a cross-head, *b*, and operate horizontally in suitable slots, *c*, in the table B. The cross-head *b* moves back and forth on a suitable guide, *d*, secured to the under surface of the table B, motion being imparted to it by means of a rock-shaft, *e*, from which extends an arm, *f*, that connects with the cross-head by pitman-rods *g*. The connection between said pitman-rods and the cross-head is effected by a rod, *h*, which is secured in the tail-ends of two dogs, *i*, that are pivoted to the ends of the cross-head, as shown in Figs. 1 and 2 of the drawings. The front ends or points of the dogs *i* project into notches *j* cut into the lower edges of the toes *a* in such a manner that if the strain exerted by the pitman-rods *g* is in the direction of the arrow marked thereon in Fig. 1 the dogs will turn up and cause the points of the toes *a* to project above the surface of the table B just enough to take off the lowest blank from the pile, (which is indicated in red outlines in Fig. 1,) and as soon as the motion of the rock-shaft *e* is reversed, and the strain exerted by the pitman-rods *g* is in the direction opposite that indicated by the arrow marked hereon in Fig. 1, the dogs *i* turn down and the points of the toes *a* are thrown below the surface of the table, allowing them to return under the pile of blanks without taking effect thereon. While the blank is thus passed to the main die-plate, C, it is guided by gages *k*, which are screwed down to the table, and by curved arms *l*, which serve to hold said blanks down upon the table; and at the same time three (more or less) strips of muslin or other textile material are fed or passed over the secondary die-plate D, which is suspended a short distance above the main die-plate, as clearly shown in Figs. 1 and 2 of the drawings. These strips of muslin, to which suitable glue or paste has been applied and then dried, are cut just wide enough to produce the annular disks which serve to strengthen the edges of the button-holes, and they are taken or unwound from drums *m*, and drawn along over the die-plate and under the dies by the action of the feed-rollers *n*, to which an intermittent rotary motion is imparted by means of a spring-pawl, *o*, and ratchet-wheel *p*, mounted upon the end of the bearing or axle of one of said feed-rollers, as shown in Figs. 2, 3, and 4. The lower roller is adjustable by means of an eccentric shaft or other suitable means. The pawl *o* is guided in a bracket, *g*, secured to the side of the frame A, and the required motion is imparted to it by a cam, *r*, which is mounted on the crank-shaft *s*, and with which it is held in contact by its spring. The suspended die-plate D is provided with two sets of holes, *t u*, (see Fig. 4,) and into these holes fit the punches *v w*, which are secured to or in a cross-head, E, which carries the punches. By the action of the punches *v* and dies *t* holes are punched into the strips of muslin or other textile fabric to correspond to the inner peripheries of the annular disks, and as the strips advance the punches *w* take effect. These punches are provided with concentric projections *w*, which fit into the holes punched out by the punches *v*, so that the width of the annular disks will be uniform all around; and as the punches *w* pass down through the dies *u*, the projections *w'* enter the dies *u'* in the main die-plate, and suitable holes are punched in the blanks, which are passed onto the die-plate by the action of the dogs *i*. After the button-holes have thus been punched in the blanks at the proper places, the annular disks cut out by the combined action of the punches *v* and *w* are carried down and pressed on the surface of the blanks; and if a suitable cement is applied to the under surface of the strips of muslin the annular disks will be made to adhere to the edges of the button-holes in the blanks, being pressed firmly upon the blanks by the shoulder of the punch *w*. In practice, a cement may be applied which is hard when cold, and which can be made to adhere only by the combined action of heat and pressure; or a jet of steam or water may be applied to the surfaces of the blanks as they pass under the dies, which will cause the disks to adhere to the blanks, when said disks are pressed thereon by the punches *w*. The lower part of the punches *w*, which presses the disks upon the blanks, may be engraved in imitation of embroidery or stitching, so that after the disks have been applied the button-holes, or the disks around them, may have the appearance of having been stitched or embroidered.

After the annular disks have thus been made to adhere to the blanks, the punches recede, and the pusher-bars *b'* take action and force said blank from under the die-plate, between the roller *c'* and the endless apron *d'*. Said pusher-bars are fitted in suitable slots in the table B, and the desired motion is imparted to them by the action of the cross-head *b* on dogs *e'*, which are hinged to the under side of the pusher-rods, and by springs *f'*, which have a tendency to carry the pusher-bars back to their original position.

As the cross-head *b* advances, it carries the pusher-bars forward until the dogs *e'* come in contact with the stops *g'*. By the action of these stops the dogs are disengaged from the cross-head, and the pusher-bars are allowed to follow the action of the springs *f'* and to fly back to their original position.

The endless apron *d'* is stretched over two rollers, *h' i'*, and said apron is composed either of a series of rubber bands or of a single sheet of canvas or other textile fabric, and the roller *h'* is mounted in spring-arms *j*, so that it is capable of adjusting itself to the thickness of the blanks passing through between it and the roller *c'*. The motion of the various parts of the machine is effected by the driving-shaft *k'*, which is mounted in the lower part of the frame A. On this shaft is mounted a pulley, C, and a belt, *m*, transmits the motion from the same to the crank-shaft *s;* and another belt, *n*, stretched over a pulley, *o'*, on the driving-shaft, and over another pulley, *p'*, on the end of the roller *i'*, produces the desired motion of the apron *d*. From the pulley *p'* extends another belt, *q'*, over the pulley *r'* on the end of the roller *c'*. The motion of the rock-shaft *e* is produced by a pitman-rod, *s'*, which extends from an eccentric wrist-pin in a disk, *t'*, which is mounted on the crank-shaft *s*, to a crank, $u^2$, on said rock-shaft.

In practice it may be found desirable to dispense with the projecting punches *w'* and their dies *u'* in the die-plate C, and also the punches *v'* and their dies *t* in the die-plate D, retaining the punches *w* and their dies *u* in the plate D, and also the solid plate C, as it might be found more desirable to apply the patches or annular disks to the blanks and then punch the button-holes through both afterward by another and separate operation, in which case the same operation and same machine as that herein described would be employed, so far as applying the patches is concerned.

This method of applying the annular disks or patches from a continuous strip of prepared cloth by machinery to button-holes in articles of paper wearing-apparel has never to our knowledge been used before, and constitutes an important feature of the invention, and it is equally applicable to the application of said patches to paper in the sheet or strip before the paper is cut into said articles of wearing-apparel as after by simply dispensing with the use of the feeding-toes. By this means the operation of applying annular disks of cloth or other strengthening material to collars, cuffs, and other articles of paper wearing-apparel, and punching button-holes therein, is carried on automatically, and can be effected very expeditiously and with little loss of time or attention.

If desired, the dies, punches, and plungers may be made adjustable, so that they can be used for articles of several different sizes.

Having described the invention, what we claim as new, and desire to secure by Letters Patent, is—

1. The combination of the suspended die-plate D, main die-plate or bed C, and punches *v w*, constructed and operating substantially as herein described, and for the purposes specified.

2. The feeding-toes *a*, in combination with dogs *i*, bars *h*, and rods *g*, constructed and operating substantially as and for the purpose herein described.

3. The pusher-bars *b'*, in combination with the dogs *e'*, cross-head *b*, and springs *f'*, constructed and operating substantially as herein described and set forth.

4. The combination of the rolls *n n*, one of which has the ratchet *p* thereon, with the drums *m*, all constructed and operating substantially as herein described, and for the purposes specified.

5. Applying re-enforcing patches to button-holes of collars or cuffs automatically—that is to say, by mechanism which moistens or heats the paper or collar or patch, and then presses the said patches upon the paper or collar, substantially as described.

GEO. W. RAY,
VARNUM N. TAYLOR,
*Assignees.*

Witnesses:
T. A. CURTIS,
F. E. RICE.